United States Patent
Luo et al.

(10) Patent No.: US 10,626,026 B2
(45) Date of Patent: Apr. 21, 2020

(54) MULTIFUNCTIONAL MEMBRANELESS BOILED WATER ELECTROLYSIS MACHINE

(71) Applicants: Minxiong Luo, Shenzhen (CN); Ming Li, Shenzhen (CN)

(72) Inventors: Minxiong Luo, Shenzhen (CN); Ming Li, Shenzhen (CN)

( * ) Notice: Subject to any disclaimer, the term of this patent is extended or adjusted under 35 U.S.C. 154(b) by 73 days.

(21) Appl. No.: 15/687,270

(22) Filed: Aug. 25, 2017

(65) Prior Publication Data

US 2018/0002201 A1 Jan. 4, 2018

Related U.S. Application Data

(63) Continuation of application No. PCT/CN2016/000091, filed on Feb. 24, 2016.

(30) Foreign Application Priority Data

Feb. 26, 2015 (CN) .......................... 2015 1 0087724

(51) Int. Cl.
*C02F 1/46* (2006.01)
*C02F 1/461* (2006.01)

(52) U.S. Cl.
CPC .......... *C02F 1/46104* (2013.01); *C02F 1/461* (2013.01); *C02F 2001/46152* (2013.01); *C02F 2201/4611* (2013.01); *C02F 2201/46155* (2013.01); *C02F 2307/10* (2013.01)

(58) Field of Classification Search
CPC .................. C02F 1/46104; C02F 1/461; C02F 2201/46155; C02F 2201/4611
See application file for complete search history.

(56) References Cited

U.S. PATENT DOCUMENTS 2,938,849 A * 5/1960 Stoddard ............. A47L 15/4229
204/263

FOREIGN PATENT DOCUMENTS

| CN | 1297853 A | 6/2001 |
| CN | 2527552 Y | 12/2002 |
| CN | 202529893 U | 11/2012 |

(Continued)

*Primary Examiner* — Arun S Phasge
(74) *Attorney, Agent, or Firm* — Cheng-Ju Chang

(57) ABSTRACT

A multifunctional membraneless boiled water electrolysis machine comprises a container (21) for containing raw water, and a water electrolysis apparatus. The water electrolysis apparatus is mounted outside the container (21) for containing raw water and comprises an electrolysis power supply (9), an electrolysis water tank (10) and an electrolysis electrode assembly (18) located in the electrolysis water tank. A water outlet at a bottom of the container for containing the raw water is connected with a water pump (24) through a pipeline. The water pump (24) is connected with a water inlet (15) of the electrolysis water tank (10) through the pipeline. The raw water in the container can flow into the electrolysis electrode assembly (18) from the water inlet (15) of the electrolysis water tank (10) after being heated or boiled by a heater (16). The water is electrolyzed through the gaps between the electrodes of different polarities in the electrolysis electrode assembly (18). The electrolyzed water flows from a water outlet (28) of the electrolysis water tank (10) to satisfy needs of people for the electrolyzed water of different water temperatures.

11 Claims, 2 Drawing Sheets

(56) References Cited

FOREIGN PATENT DOCUMENTS

| | | | |
|---|---|---|---|
| CN | 203668073 | U | 6/2014 |
| CN | 104229946 | A | 12/2014 |
| CN | 204265494 | U | 4/2015 |
| CN | 104591467 | A | 5/2015 |
| CN | 104609513 | A | 5/2015 |
| CN | 104609514 | A | 5/2015 |
| CN | 104609515 | A | 5/2015 |
| CN | 104628092 | A | 5/2015 |
| CN | 104633912 | A | 5/2015 |
| CN | 104649375 | A | 5/2015 |
| CN | 104709974 | A | 6/2015 |
| CN | 104709975 | A | 6/2015 |
| CN | 104709976 | A | 6/2015 |
| CN | 204675865 | U | 9/2015 |
| CN | 204675866 | U | 9/2015 |
| CN | 204675867 | U | 9/2015 |
| CN | 204675868 | U | 9/2015 |
| CN | 204675869 | U | 9/2015 |
| CN | 204689685 | U | 10/2015 |
| CN | 204689805 | U | 10/2015 |
| CN | 105060413 | A | 11/2015 |
| CN | 105060414 | A | 11/2015 |
| CN | 204752287 | U | 11/2015 |
| CN | 105217738 | A | 1/2016 |
| CN | 204987427 | U | 1/2016 |
| CN | 205011439 | U | 2/2016 |
| JP | 2005279538 | A | 10/2005 |
| JP | 2009082864 | A | 4/2009 |

\* cited by examiner

MULTIFUNCTIONAL MEMBRANELESS BOILED WATER ELECTROLYSIS MACHINE

TECHNICAL FIELD

The present invention relates to a multifunctional membraneless boiled water electrolysis machine and belongs to the technical field of membraneless water electrolysis.

BACKGROUND

The positive significances of water electrolysis machines and electrolyzed water drunk for antioxidation therapy and health care have been known by more and more people, and how to arbitrarily drink and use the electrolyzed water anywhere or anytime becomes a pursuit of many people. However, the water electrolysis machine adopting a membrane water electrolysis technology can only be fixedly mounted at a faucet for use and can only electrolyze normal-temperature tap water. The electrolyzed normal-temperature tap water can be drunk only after being heated generally. However, the functions of the electrolyzed water would be lost when the electrolyzed water is heated to a temperature exceeding about 50 DEG C., so that the electrolyzed water cannot be used for making tea, coffee and the like. The existing water electrolysis machines and electrolyzed water thereof have these limitations, and popularized drinking and use of the electrolyzed water are restricted. A membraneless water electrolysis technology can electrolyze raw water with various temperatures in principle, however, due to the technical limitations at present, the application is limited to the water electrolysis in cup and pot type apparatuses, an electrolysis time needs a few minutes and even longer, and a water temperature is largely decreased. So far, there is no technical solution of a boiled water electrolysis machine capable of directly electrolyzing boiled water. Many people is looking forward to that directly using the electrolyzed boiled water to make tea, coffee or the like for drinking to get expected taste and enjoyment; and moreover, the electrolyzed water with different temperatures also has other purposes of cooking, washing and the like, has rather wide practical significance and occupies a large market. The multifunctional membraneless boiled water electrolysis machine of the present invention is just an innovative technical apparatus for solving such problem.

SUMMARY

The present invention discloses a multifunctional membraneless boiled water electrolysis machine which is created and designed for people to conveniently and arbitrarily drink electrolyzed hot water or boiled water. The present invention employs the membraneless water electrolysis technology with higher electrolysis efficiency so as to meet some water electrolysis index requirements. Higher water electrolysis efficiency and water electrolysis index can be obtained by employing new principles and new methods of water electrolysis, discovered and invented by the applicant, water electrolysis efficiency or efficiency of electrolyzing water can generally be defined as a ratio of a representative index of the prepared electrolyzed water (such as, an ORP negative value or a hydrogen content value of electrolyzed reduced water) to power consumption under the condition of electrolyzing a certain quantity of water and performing electrolysis for a certain time. In other words, the smaller the consumed power of an electrolyzing method or electrolysis apparatus for electrolyzing a same quantity of water to reach a same water electrolysis index is, the higher the water electrolysis efficiency of the electrolysis apparatus is.

The new water electrolysis principle and a method of remarkably increasing the water electrolysis efficiency, discovered by the applicant, are rooted in deep study on great defects of the water electrolysis principle of a traditional water electrolysis machine. The traditional water electrolysis principle is only limited to a so-called equilibrium equation of an ion chemical reaction generated by water molecule electrolysis and totally neglects electrons and impurity particles generated by electrolyzing impurities of water in the electrolysis process and important significance of the impurities of the water to the increase of water electrolysis index and the electrolysis efficiency. Therefore, a phenomenon that alkaline water in a negative polarity zone has higher key index of reduced water, i.e., higher oxidation reduction potential (ORP) negative vale and higher hydrogen (H, H2 and H—) content cannot be explained, and a key phenomenon that formation of higher ORP negative value and negative hydrogen (H—) content of water in the negative polarity zone needs a considerable quantity of active electrons is fully neglected. Therefore, the problems that the efficiency is too low, and anticipated higher water electrolysis index cannot be achieved even if an electrolysis current is increased in the existing electrolysis technology cannot be solved. The applicant gets six new discoveries after long-time study:

A first new discovery: in the water electrolysis process, in order to increase the water electrolysis efficiency, a primary task is to electrolyze the impurities in the water. The impurities are electrolyzed to generate free electrons and impurity particles which are beneficial to improving the water electrolysis index, which is called as "impurity electrolysis effect" for short herein. The impurity electrolysis effect forms certain electrolysis current and decomposes water molecules into hydrogen ions, oxygen ions or hydroxyl ions, called as "water molecule electrolysis effect" for short herein. Water electrolysis efficiency and index are results of the combined action of the "impurity electrolysis effect" and the "water molecule electrolysis effect". A second new discovery: double significances of the active electrons generated by the "impurity electrolysis effect" to the increase of the electrolysis efficiency are revealed, the active electrons not only increase the electrolysis current, but also have another important significance of preparing the reduced water through electrolysis, i.e. meet the needs of certain water electrolysis indexes such as the ORP (negative oxidation reduction potential) negative value and a corresponding hydrogen content (negative hydrogen content) of the electrolyzed reduced water for the electrons. Therefore, in order to increase the electrolysis efficiency, the electrolysis process should strengthen the "impurity electrolysis effect" as much as possible so as to produce more active electrons. A third new discovery: small gaps of electrodes of different polarities (especially small gaps smaller than 1 mm) have a remarkable effect in strengthening the "impurity electrolysis effect". The actual significance of small spacing is not understood even if a previous isolating-membrane-free water electrolysis technology also mentions a design consideration that the spacing of the electrodes of different polarities is smaller than 3 mm. A matched technological initiative is also hard to achieve the effect of remarkably increasing the water electrolysis efficiency. A fourth new discovery: another important significance of designing small spacing of the electrolysis electrode gaps is to create more opportunities and better conditions for combining the active electrons with active hydrogen H into negative hydrogen, so as to obviously increase the efficiency of preparing the reduced water through electrolysis. A fifth new discovery: when the small gap of the electrodes of different polarities is as small as a certain value, the electrolysis efficiency is not increased but decreased, and what is the reason? Study proves that: in order to strengthen the "impurity electrolysis effect", a certain fluidity of water in the gaps of the electrodes of different polarities is necessary in the electrolysis process, which can promote that more water molecules and impurities are repeatedly electrolyzed, so that the "impurity electrolysis effect" is strengthened, and the water electrolysis efficiency and the electrolyzed water reduction index are increased. In-depth study on the fluidity in the water electrolysis process explains why the water electrolysis efficiency is not increased but decreased after the electrolysis current is increased to a certain value. An important reason is that: if the water fluidity in the electrode gaps is not good, an ion concentration in the electrode gaps would be too high, and the electrolysis efficiency is influenced. A sixth new discovery: for electrolysis of flowing water driven by an external force, such as flowing tap-water, a design solution by reasonably increasing electrode-surface areas of the electrolysis gap with a certain volume of the electrode assembly contributes to enabling many impurities and water molecules in the water to be repeatedly electrolyzed, so that the water electrolysis efficiency and the electrolysis indexes can be increased. In addition, for electrolyzing water at a very high flowing speed, a channel in which the electrolysis electrode assembly is mounted, has a water outlet channel (i.e. a water outlet) properly narrower than a water inlet channel (i.e., a water inlet), which can reduce a flow velocity of water through the electrolysis electrode assembly, thereby increase time and opportunities for impurities and water molecules to be electrolyzed, and accordingly increase the water electrolysis indexes.

By virtue of comprehensive analysis of the above six new discoveries, the applicant proposes a novel water electrolysis principle as follows; a water electrolysis process firstly is a process for electrolyzing the impurities in the water to produce the active electrons and form current so as to convert electric energy into decomposition energy of the water molecules; and a basis of obtaining high electrolysis efficiency is to enable more water molecules to obtain high electric energy to be decomposed, however, additional important conditions are needed for obtaining the high electric energy because the electrolysis process is also a process of generating physical and chemical actions among various hydroxide ions and ion radicals produced by decomposing various ions (particularly the active electrons) released by the electrolyzed impurities and the water molecules. In this process, to increase the water electrolysis efficiency, two important conditions are as follows: Firstly, if many impurities are electrolyzed, many electrons and ions are released from the impurities, a probability of combining with the hydroxide ions is high, the water electrolysis indexes may be high, and then the electrolysis efficiency is high; and secondly, if the conditions are created to make that the probability of combining the electrons and ions released by the electrolyzed impurities with the hydroxide ions is high, the water electrolysis indexes may be high, and then the electrolysis efficiency is high. For example, to obtain a high ORP negative value and a high hydrogen content (the two indexes are briefly called as "negative hydrogen" indexes by the applicant) in the electrolyzed reduced water, participation of more active electrons is needed. Therefore, the impurities in the water are electrolyzed to release more electrons and the probability of combining the electrons with the hydrogen ion is high, so as to increase the negative hydrogen indexes and the electrolysis efficiency.

The novel water electrolysis principle disclosed by the applicant is: a three-pronged method for increasing the electrolysis efficiency of the reduced water. The electrolysis of the impurities in the water needs to be strengthened, electrons released by the electrolysis of the impurities needs to be increased, and the probability of combining the electrons released by the electrolysis of the impurities with the hydrogen into negative hydrogen needs to be increased. The applicant finds a specific three-pronged method through researches: firstly, properly decreasing an electrolysis gap between electrodes of different polarities; secondly, properly increasing electrode surface areas of the electrolysis gaps; and thirdly, keeping a proper water fluidity flowing in and out of the gap between the electrodes of different polarities in the water electrolysis process. When the three technical conditions are coordinated, effects of intensifying the electrolysis of the impurities and increasing the reduction indexes can be well considered simultaneously, thereby obviously increasing the water electrolysis efficiency.

The multifunctional membraneless boiled water electrolysis machine of the present invention comprises a container for containing raw water, a heater capable of heating or boiling water, a controllable electrolysis power supply and an electrolytic cell with a water inlet and a water outlet. An electrolysis electrode assembly is mounted in the electrolytic cell and adopts a membraneless water electrolysis technology with higher efficiency. The raw water in the container can enter the electrolysis electrode assembly through the water inlet of the electrolytic cell after being heated by the heater or becoming boiled water. The water is electrolyzed in the gaps between the electrodes of different polarities of the electrolysis electrode assembly; and the electrolyzed water flows from the water outlet of the electrolytic cell.

In the multifunctional membraneless boiled water electrolysis machine of the present invention, in the electrolysis electrode assembly, electrodes of different polarities are spaced with a gap therebetween configured according to a reasonable minimization principle, and the gap is less than 5 mm and more than 0 mm, thereby electrolysis of the impurities and the water molecules in water are enhanced; areas of the spaced electrodes of different polarities are configured according to a reasonable maximization principle in a certain volume of the electrolysis electrode assembly, so that more impurities and water molecules in water can be repeatedly electrolyzed in the gap between the electrodes; and the electrolysis electrode assembly and mounting the same is featured that: during the water electrolysis process, water can smoothly flow in the gap between the electrodes of different polarities, so that water electrolyzed in the gap between the electrodes of different polarities can be replaced, more impurities and water molecules are repeatedly electrolyzed by the electrodes of different polarities, and probability and quantities of the impurities and the water molecules electrolyzed by the electrodes of different polarities are increased, thereby the electrolysis efficiency of the water is increased.

In the multifunctional membraneless boiled water electrolysis machine of the present invention, in the electrolysis electrode assembly, the gap between the electrodes of different polarities of the electrolysis electrode assembly can be as small as 1 mm or less when necessary, which can enhance the electrolysis of the impurities and the water molecules in the water and increase of the water electrolysis efficiency under a certain electrolysis power and a certain electrolysis electrode assembly structure.

In the multifunctional membraneless boiled water electrolysis machine of the present invention, the electrolysis electrode assembly can make daily drinking water and used water into electrolyzed reduced water with an oxidation-reduction potential of a negative value and a hydrogen content more than zero.

In the multifunctional membraneless boiled water electrolysis machine of the present invention, the electrolysis electrode assembly is composed of different electrodes of two polarities; one-polarity electrode has a shape of cylindrical walls each defining a hole thereof; the walls of the holes are mechanically fixed and are electrically connected with one other; the number of holes of the electrode shaped of cylindrical walls each defining a hole is N, and N is equal to or more than 1; the walls of the holes may or may not define notches; the other-polarity electrode has columns, a plurality of columns are mechanically fixed and electrically connected with one another, the number of the columns of the electrode is M, M is equal to or more than 1, and the columns are hollow or solid and may or may not have notches; heights of the electrode shaped of cylindrical walls each defining a hole and the column electrodes are not limited and are selectable according to needs; the electrode shaped of cylindrical walls each defining a hole and the column electrodes are correspondingly inserted to each other, i.e., each column electrode is inserted into the corresponding hole of each cylindrical wall, and there is an electrode gap for electrolyzing water between an inserted column surface and an opposite surface of each cylindrical wall, water in the electrode gap can flow in an electrolysis operating process; and there is a space outside of each of opposite ends of the electrode gap, so that the water can flow in the gap between the positive electrode and the negative electrode in the electrolyzed process.

In the multifunctional membraneless boiled water electrolysis machine of the present invention, for the electrolysis electrode assembly, a certain space is reserved outside positions at two ends of the electrode gap, so that the water can smoothly flow in the gap between the electrodes of different polarities while flowing in the electrolyzed process, thereby increasing the electrolysis efficiency of the water.

In the multifunctional membraneless boiled water electrolysis machine of the present invention, for the electrolysis electrode assembly, time of electrolyzing the flowing water in the electrode gap can be prolonged by reasonably increasing the electrode surface areas of the electrode gap in the electrode assembly with a certain volume, so that more impurities and water molecules can be repeatedly electrolyzed by the electrodes of different polarities, and the probability and the quantities of the impurities and the water molecules electrolyzed by the electrodes of different polarities are increased, thereby the water electrolysis efficiency is increased.

In the multifunctional membraneless boiled water electrolysis machine of the present invention, for the electrolysis electrode assembly, a water outlet channel of the electrolysis electrode assembly is narrower than a water inlet channel to appropriately slow down a flow velocity of water flowing into the gap between the electrolysis electrodes, so that more impurities and water molecules can be repeatedly electrolyzed by a current between the electrodes of different polarities, and the probability and the quantities of the impurities and the water molecules electrolyzed by the electrodes of different polarities are increased, thereby the water electrolysis efficiency is increased.

In the multifunctional membraneless boiled water electrolysis machine of the present invention, an electrolytic cell wall enclosing the electrolysis electrode assembly therein has a suitable material and shape for serving as electrodes, and can be properly connected to serve as an electrolysis electrode, thereby the electrode surface areas of the gap between the electrolysis electrode are increased and thus the water electrolysis efficiency is increased.

The basic technical solution is as follows: the multifunctional membraneless boiled water electrolysis machine of the present invention comprises a container for containing raw water, a heater capable of heating or boiling water, a controllable electrolysis power supply and an electrolytic cell with a water inlet and a water outlet. An electrolysis electrode assembly is mounted in the electrolytic cell and adopts a membraneless water electrolysis technology with higher efficiency. The raw water in the container can enter the electrolysis electrode assembly through the water inlet of the electrolytic cell after being heated by the heater. The water is electrolyzed through the gaps between the electrodes of different polarities of the electrolysis electrode assembly; and the electrolyzed water flows from the water outlet of the electrolytic cell.

A first technical solution of the present invention is as follows: for the electrolysis electrode assembly, a gap distance between the electrodes of different polarities is designed according to a reasonable minimization principle in the electrolysis electrode assembly with a certain volume, and the gap is less than 5 mm and more than 0 mm, thereby electrolysis of the impurities and the water molecules in the water can be enhanced; electrode surface areas of the gap between the electrodes of different polarities is designed according to a reasonable maximization principle in the electrolysis electrode assembly with a certain volume, so that more impurities and water molecules in the water can be repeatedly electrolyzed in the electrode gap; and the electrolysis electrode assembly and mounting the same is featured that: in the water electrolysis process, the water can smoothly flow in the gap between the electrodes of different polarities, so that the water electrolyzed in the gap between the electrodes of different polarities can be replaced, more impurities and water molecules are repeatedly electrolyzed by the electrodes of different polarities, and probability and quantities of the impurities and the water molecules electrolyzed by the electrodes of different polarities are increased, thereby the electrolysis efficiency of the water is increased.

A second technical solution of the present invention is as follows: for the electrolysis electrode assembly, the gap between the electrodes of different polarities of the electrolysis electrode assembly can be 1 mm or less if necessary, thereby the electrolysis of the impurities and the water molecules in the water are enhanced and the water electrolysis efficiency is increased under a certain electrolysis power and with a certain electrolysis electrode assembly structure.

A third technical solution of the present invention is as follows: the electrolysis electrode assembly can make daily drinking water and used water into electrolyzed reduced water with an oxidation-reduction potential of a negative value and a hydrogen content more than zero.

A fourth technical solution of the present invention is as follows: the electrolysis electrode assembly is composed of two different polarity electrodes; one-polarity electrode has a shape of cylindrical walls each defining a hole thereof; the walls of the holes are mechanically fixed and are mutually electrically connected with one other, the number of holes of the electrode shaped of cylindrical walls each defining a hole is N, and N is equal to or more than 1; notches may not or may be defined in the cylindrical walls; the other electrode has columns, a plurality of columns are mechanically fixed and mutually electrically connected with one another, the number of the columns is M, M is equal to or more than 1, and the columns are hollow or solid and may have or do not have notches; heights of the electrode shaped of cylindrical walls each defining a hole and the column electrode are not limited and are selected according to needs; the electrode shaped of cylindrical walls each defining a hole and the column electrode are correspondingly inserted into each other, i.e., each column is inserted into each corresponding hole of the cylindrical wall, and an electrode gap for electrolyzing water is defined between an inserted column surface and an opposite surface of each cylindrical wall; water in the electrode gap can flow in an electrolysis operating process; and there is a certain space outside each of two ends of the electrode gap, so that the water can flow in the gap between the positive electrode and the negative electrode in the electrolyzed process.

A fifth technical solution of the present invention is as follows: for the electrolysis electrode assembly, a certain space is reserved outside positions at each of two opposite ends of the electrode gap, so that the water can smoothly flow in the gap between the electrodes of different polarities while flowing in the electrolyzed process, thereby increasing the electrolysis efficiency of the water.

A sixth technical solution of the present invention is as follows: for the electrolysis electrode assembly, time of electrolyzing the flowing water in the electrode gap can be prolonged in the electrolysis electrode assembly by reasonably increasing the electrode surface areas of the electrode gap, so that more impurities and water molecules can be repeatedly electrolyzed by the electrodes of different polarities, and the probability and the quantities of the impurities and the water molecules electrolyzed by the electrodes of different polarities are increased, thereby the water electrolysis efficiency is increased.

A seventh technical solution of the present invention is as follows: for the electrolysis electrode assembly, a water outlet channel of the electrolysis electrode assembly is designed to be narrower than a water inlet channel to appropriately slow down water flowing in the gap of the electrolysis electrodes, so that more impurities and the water molecules can be repeatedly electrolyzed by current between the electrodes of different polarities, and the probability and the quantities of the impurities and the water molecules electrolyzed by the electrodes of different polarities are increased, thereby the water electrolysis efficiency is increased.

An eighth technical solution of the present invention is as follows: under a condition that an electrolytic cell wall enclosing the electrolysis electrode assembly therein has a suitable material and shape for serving as an electrode and is properly connected to serve as an electrolysis electrode, thereby electrode surface areas of the gap of the electrolysis electrode is increased, and thus the water electrolysis efficiency is increased.

BRIEF DESCRIPTION OF DRAWINGS

The present invention is further described below through drawings.

DETAILED DESCRIPTION

A basic structure and a basic working principle of an embodiment are described below in combination with the first embodiment and FIGS. 1A and 1B.

The first embodiment

Figure 1A:
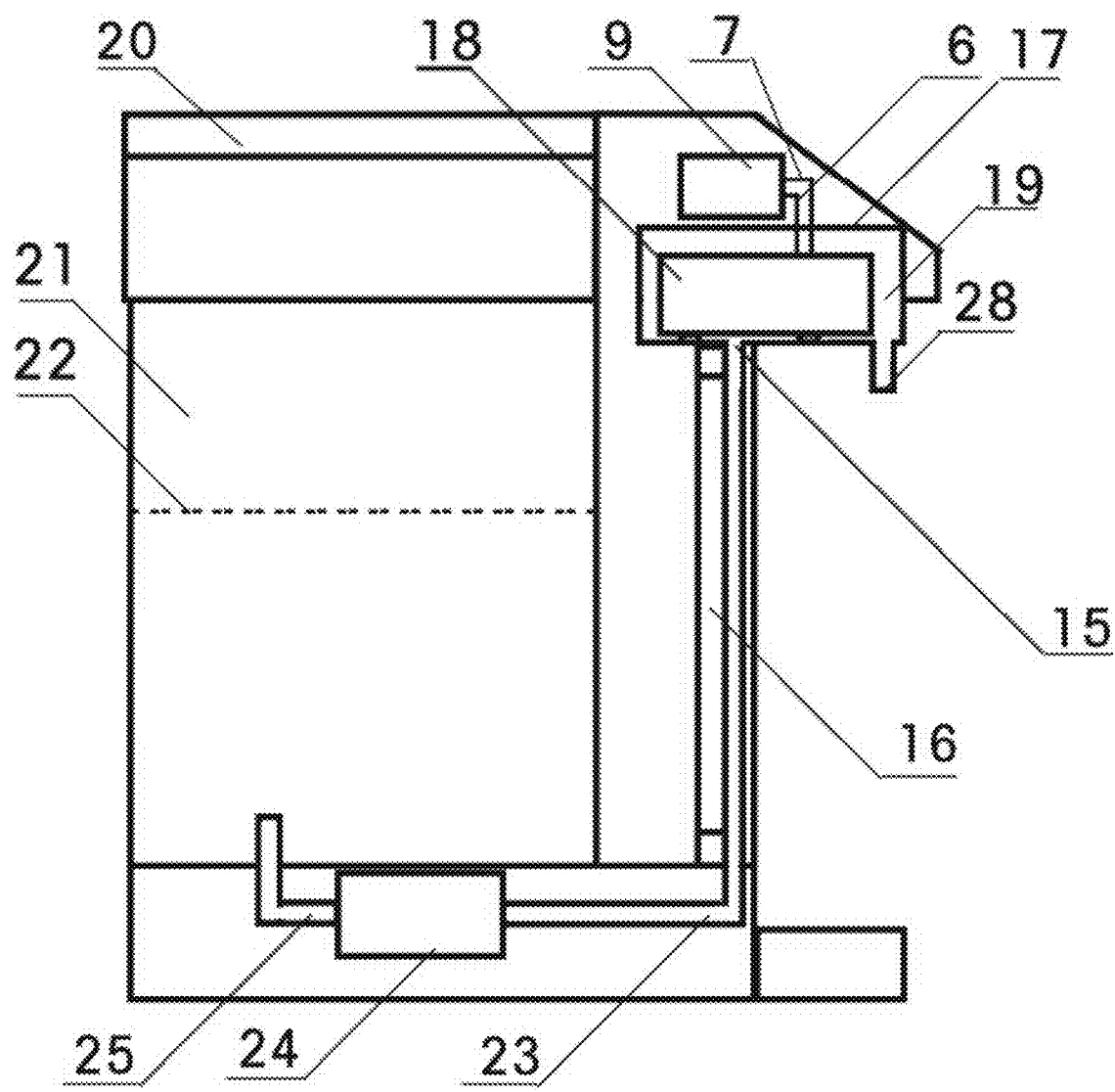
FIG. 1A is a multifunctional membraneless boiled water electrolysis machine of the first embodiment of the present invention.

As shown in FIG. 1A, a multifunctional membraneless boiled water electrolysis machine comprises: a container 21 for containing water; a container cover 20, wherein the label number 22 refers to a water level indicating line; an electric heater 15 capable of heating or boiling water; an electrolysis power supply 9; and an electrolytic cell 10 with a water inlet and a water outlet. An electrolytic cell partition plate 11 divides the electrolysis water tank 17 into a region for an electrolysis electrode assembly 18 as the electrolytic cell 10 and an electrolytic cell water outlet region 19. The electrolysis electrode assembly 18 for electrolyzing water is mounted in the electrolytic cell (details about an internal structure thereof referring to FIG. 1B and the following relevant description thereof). The water in the container 21 can be pumped into an electrolysis water tank 17 and the electrolytic cell 10 by an electric pump 24 through a water outlet pipe 25 at a bottom of the container and a water outlet pipeline 23 of the electric pump. An electric heater 16 is mounted at a vertical part of a pipeline 23. The water enters the electrolysis water tank 17 and the electrolytic cell 10 from a water inlet 15 (formed at the top of the water pipeline 23) of the electrolysis water tank 17 after being heated (capable of being controlled without being heated). The electrolyzed water flows from the upper part of the electrolytic cell into the electrolytic cell water outlet region 19 and flows from the water outlet of the electrolysis water tank 17 i.e., an apparatus water outlet 28. Wires 6 and 7 connect electrolysis power supply 9 to different electrodes of the electrolysis electrode assembly 18. The electrolysis electrode assembly in the drawing adopts a technical solution of membraneless water electrolysis with high efficiency so as to achieve certain water electrolysis indexes. Referring to FIG. 1B and a description thereof for details.

Figure 1B:
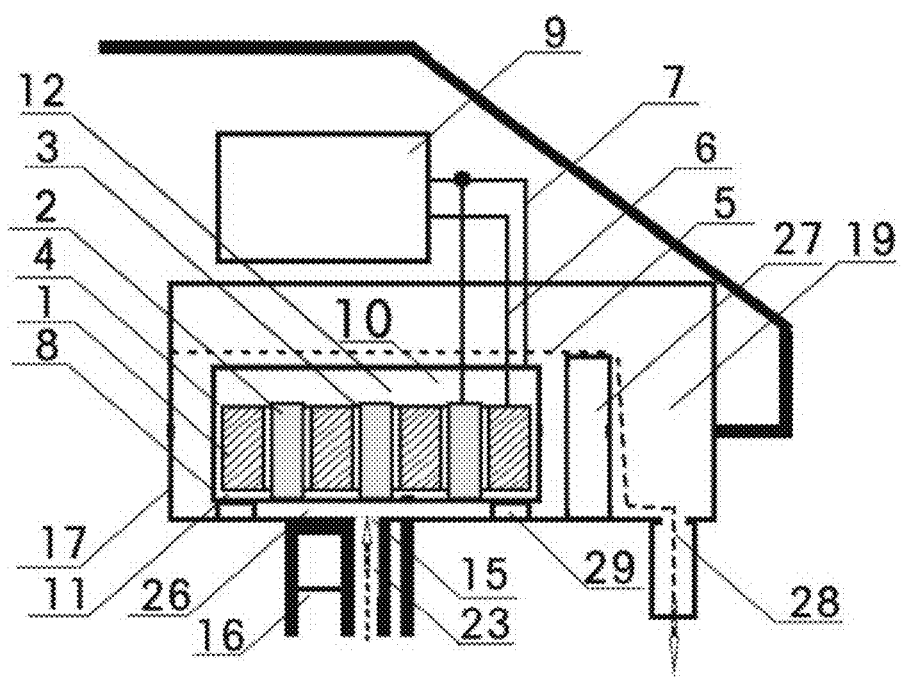
FIG. 1B is a relevant portion of an electrolysis electrode assembly of a multifunctional membraneless boiled water electrolysis machine of embodiment 1 of the present invention.

FIG. 1B illustrates an internal structure and an associated portion of an electrolysis assembly 18 (comprising an electrolytic cell and an electrolysis electrode assembly). Portions described in FIG. 1A are not repeatedly described again here. The label number 10 refers to an electrolytic cell, and the label number 8 refers to an electrolytic cell wall. The water from the pipeline 23 enters a space 26 through the water inlet 15 in the lower part of the electrolysis water tank 17, and the space 26 is isolated by a sealing ring 29 and is not directly communicated with other spaces of the electrolysis water tank 17, so that the water can enter a lower space 11 of the electrolytic cell 10 only and is electrolyzed by the electrolysis electrodes 1 and 2 in a gap 3 and a gap 4. The electrolyzed water flows out of the upper parts of the gap 3 and the gap 4, enters an upper space 12 of the electrolytic cell 10, then flows out of the upper part of the electrolytic cell wall 8, enters the electrolysis water tank 17, flows over a water storage baffle plate 27 to flow into the water outlet region 19 of the electrolysis water tank 17 once the stored water exceeds a water level line 5, and flows out of the apparatus water outlet 28 for use.

In FIG. 1B, the electrolysis electrode assembly is formed by two electrodes 1 and 2 of different polarities. The electrode 1 is has a shape of cylindrical walls each defining a hole thereof. Three holes are schematically defined as shown in the figures. The cylindrical walls are mechanically fixed; the walls of holes are mutually electrically connected with one another to form the electrode 1, and the electrode 1 is connected with the electrolysis power supply 9 through the wire 7. The electrode 2 has columns. Three columns are schematically shown in the drawing. The columns are mechanically fixed and electrically connected with one another to form the electrode 2, and the electrode 2 is connected with the electrolysis power supply 9 through the wire 6. The electrode 1 can be correspondingly inserted with the electrode 2, each column of the column electrode 2 can be inserted into the corresponding hole of the electrode 1 shaped of cylindrical walls each defining a hole, and an electrode gap 3 is defined between the column surface and the cylindrical hole-wall surface in a tubular shape. Three gaps 3 formed by the three columns of the electrode 2 and the three holes of the electrode 1 are schematically shown in FIG. 1B. Each gap distance can be selected within a certain range as desired, for example, in a range smaller than 5 mm and greater than 0 mm. If necessary, the gap 3 can be smaller, for example, smaller than 1 mm and greater than 0 mm for enhancing the electrolysis effect of the water and the impurities in the water. Higher water electrolysis efficiency and indexes can be acquired using the apparatus to electrolyze raw water with low conductivity, such as purified water, distilled water and the like. Under the condition that the electrode gap is fixed, the probability and the quantity of the impurities and the water molecules electrolyzed are in proportion to the electrode surface areas of the gaps. Therefore, maximization of electrode surface areas of the gap 3 can increase the electrolysis efficiency. In FIG. 1B, the electrolytic cell wall 8 has a material suitable for being used as the electrolysis electrode, is connected with the electrolysis power supply through the wire 7 to become a portion of the electrode 2 and defines an electrolysis gap 4 between the electrolytic cell wall and the electrode 1, thereby the electrolysis effect of the apparatus is increased. Label numbers 11 and 12 denotes the lower space and the upper space of the electrolytic cell 10 respectively have a certain volume, so that smooth flowing of the water in the electrode gaps is facilitated. Since in the water electrolysis process, the water molecules in the gaps can produce hydrogen gas and oxygen gas after being electrolyzed; the hydrogen gas and the oxygen gas can flow upwards along the electrodes of the gaps so as to drive the water in the gaps 3 to flow upwards, and flows out from an upper port of each gap 3 into the space 12, which results that water continuously flow into the electrode gaps for supplementation from the external of a lower port of each gap 3, i.e. from a space 11. Apparently, if the spaces 11 and 12 are too narrow, the flowability of water in the electrode gaps may be influenced. The water flowing from the water inlet 15 of the electrolytic cell flows into 11 cannot be electrolyzed in the gaps at an expected flow rate, which will decrease the water electrolysis efficiency. In conclusion, a smaller gap, larger electrode surface areas of the gap 3, and a certain water flowability in the gap 3 are reasonably selected, thus at such three aspects of technical solutions coordinated and simultaneously considered, the electrolysis efficiency can be obviously increased. Since the apparatus is used for electrolyzing flowing water, generally speaking, if the spaces 11 and 12 outside the ports of the gap 3 are wide enough, water flowability in the gap 3 may be easily satisfied so as to obtain higher electrolysis efficiency and water electrolysis indexes.

Table 1 and Table 2 are actual detection data of an experimental apparatus of the present invention.

Table 1: actual detections data of electrolysis boiled water of embodiment 1 of the multifunctional membraneless boiled water electrolysis machine of the present invention

| Test items | | Structural characteristics Gaps between electrodes of different polarities = 0.6 mm |
|---|---|---|
| Reduced water indexes | ORP(mv) | −612 |
| | Hydrogen content (ppb) | 631 |
| Electrolysis current (A) | | 0.6 |

Note: electrolysis voltage of 8V, raw water: ORP=+408 mv, hydrogen content=0, normal temperature It can be seen that water electrolysis index levels meets the requirements for practical products.

Table 2 is actual detection data when the areas (i.e., the height of the electrodes) of the electrolysis electrode gaps 3 in FIG. 1A and FIG. 1B are double increased.

Table 2: actual detection data of electrolysis boiled water of the multifunctional membraneless boiled water electrolysis machine in the first embodiment of the present invention

| Test items | | Structural characteristics Gaps between electrodes of different polarities = 0.6 mm (the area of the gaps between the electrolysis electrodes is increased by one time) |
|---|---|---|
| Reduced water indexes | ORP(mv) | −879 |
| | Hydrogen content (ppb) | 921 |
| Electrolysis current (A) | | 1.2 |

Note: electrolysis voltage of 8 V, raw water: ORP=+402 mv, hydrogen content=0, normal temperature It can be seen that the electrode surface areas (i.e., the height of the electrodes) of the electrolysis electrode gaps 3 is double increased; the water electrolysis indexes are remarkably improved and exceed an index of an isolating membrane water electrolysis machine, while the electrolysis efficiency exceeds that of the isolating membrane water electrolysis machine by tens times and even a hundred times. It strongly verifies accuracy and great practical significance of the new principle and the new method of water electrolysis proposed by the applicant.

The electrolysis electrode assembly of the multifunctional membraneless boiled water electrolysis machine of the present invention is not limited to a specific structure adopted by the first embodiment. Any electrolysis electrode structure which can electrolyze boiled water and reach the required water electrolysis indexes in principle can be used. On an aspect of control, electrolysis of boiled water, warm water and normal-temperature water is easily realized to prepare the electrolyzed water with various temperatures. The present invention can conveniently obtain a larger quantity of high-performance electrolyzed water with various temperatures. The electrolyzed water not only has the efficacy of preventing and helping treating various diseases on a drinking aspect, but also can be used as washing water for washing pesticide and fertilizer pollution on the surfaces of fruits and vegetables, washing faces, beautifying the faces, bathing, cleaning skin and the like.

What is claimed is:

1. A multifunctional membraneless boiled water electrolysis machine, comprising
a container for containing raw water, and
a water electrolysis apparatus mounted outside the container, comprising:
an electrolysis power supply;
an electrolysis water tank;
an electrolysis electrode assembly located in the electrolysis water tank;
a water pump for pumping water from the container into the electrolysis water tank, and connected a water outlet at a bottom of the container through a pipeline with a water inlet of the electrolysis water tank through the pipeline; and
a heater mounted in the pipeline before the water inlet of the electrolysis water tank;
wherein the electrolysis electrode assembly comprises electrolysis electrodes of different polarities with electrode gaps defined therebetween; the raw water in the container flows into the electrolysis electrode assembly from the water inlet of the electrolysis water tank after being heated or boiled by the heater; and is electrolyzed in the gaps between the electrodes of different polarities.

2. The machine of claim 1, wherein the electrodes of different polarities of the electrolysis electrode assembly comprises a positive electrode and a negative electrode, and the electrolysis power supply of the water electrolysis machine is respectively connected with the positive electrode and the negative electrode each through a wire.

3. The machine of claim 2, further comprising an electrolytic cell; wherein a partition plate divides the electrolysis water tank into an electrolysis-electrode-assembly region as the electrolytic cell and an water outlet region; the electrolysis electrode assembly for electrolyzing water is mounted in the electrolytic cell; the machine is configured that water enters the electrolysis water tank and the electrolytic cell from the water inlet of the electrolysis water tank after being heated; electrolyzed water flows from an upper space of the electrolytic cell into the water outlet region and flows from a water outlet of the electrolysis water tank for drinking or using electrolyzed hot water or boiled water.

4. The machine of claim 3, wherein a bottom surface of the electrolytic cell are sealed using a seal ring to form a lower space in the electrolysis water tank; the lower space is at an upper part of the water inlet of the electrolysis water tank; the water from the pipeline enters the lower space from the water inlet of the electrolysis water tank; the lower space is isolated by the seal ring from other spaces of the electrolysis water tank; whereby the water can only enter the lower space into the electrolytic cell, and is electrolyzed in the gaps between the electrolysis electrodes of different polarities; the electrolyzed water flows out of an upper part of the gaps, enters the upper space of the electrolytic cell, flows from an electrolytic cell wall, and enters the electrolysis water tank, and flows out of the water outlet of the electrolysis water tank for use.

5. The machine of claim 3, wherein a wall of the electrolytic cell enclosing the electrolysis electrode assembly therein has a material and shape as an electrode, is connected to the electrolysis electrode having columns, another gap defines between the wall and the electrolysis electrode shaped of cylindrical walls.

6. The machine of claim 1, wherein a gap distance between the electrodes of different polarities is configured according to a reasonable minimization principle, and the gap distance is at a range of from more than 0 mm to 5 mm, whereby electrolysis of impurities and water molecules in the water are enhanced; electrode surface areas of the gap between the electrodes of different polarities are configured according to a reasonable maximization principle whereby more impurities and water molecules in the water can be repeatedly electrolyzed in the electrode gap.

7. The machine of claim 6, wherein the gaps between the electrodes of different polarities of the electrolysis electrode assembly has a gap distance of 1 mm or less.

8. The machine of claim 1, wherein the electrolysis electrode assembly is capable of electrolyzing drinking water into electrolyzed reduced water with an oxidation-reduction potential of a negative value and a hydrogen content more than zero.

9. The machine of claim 1, wherein one-polarity electrode of the electrolysis electrode assembly has cylindrical walls each defining a hole thereof; the cylindrical walls are mechanically fixed and are electrically connected with one other; there are N holes in the electrode shaped of cylindrical walls each defining a hole, and N is equal to or more than 1; the other-polarity electrode has columns, a plurality of columns are mechanically fixed and mutually electrically connected with one another, there are M columns, M is equal to or more than 1; the electrode shaped of cylindrical walls each defining a hole and the electrode having columns are correspondingly inserted into each other, each column is inserted into each corresponding hole of each cylindrical wall, and the electrode gap for electrolyzing water is defined between an inserted column surface and an opposite surface of the cylindrical wall.

10. The machine of claim 9, wherein a certain space is defined outside each of two opposite ends of the electrode gap, whereby the water can smoothly flow in the gap between the electrodes of different polarities.

11. The machine of claim 1, wherein a water outlet channel of the electrolysis electrode assembly is narrower than a water inlet channel thereof to appropriately slow down water flowing into the gap of the electrolysis electrodes.

* * * * *